March 6, 1956  A. P. KNAPP  2,736,937
APPARATUS FOR CLADDING TANKS
Filed June 11, 1954
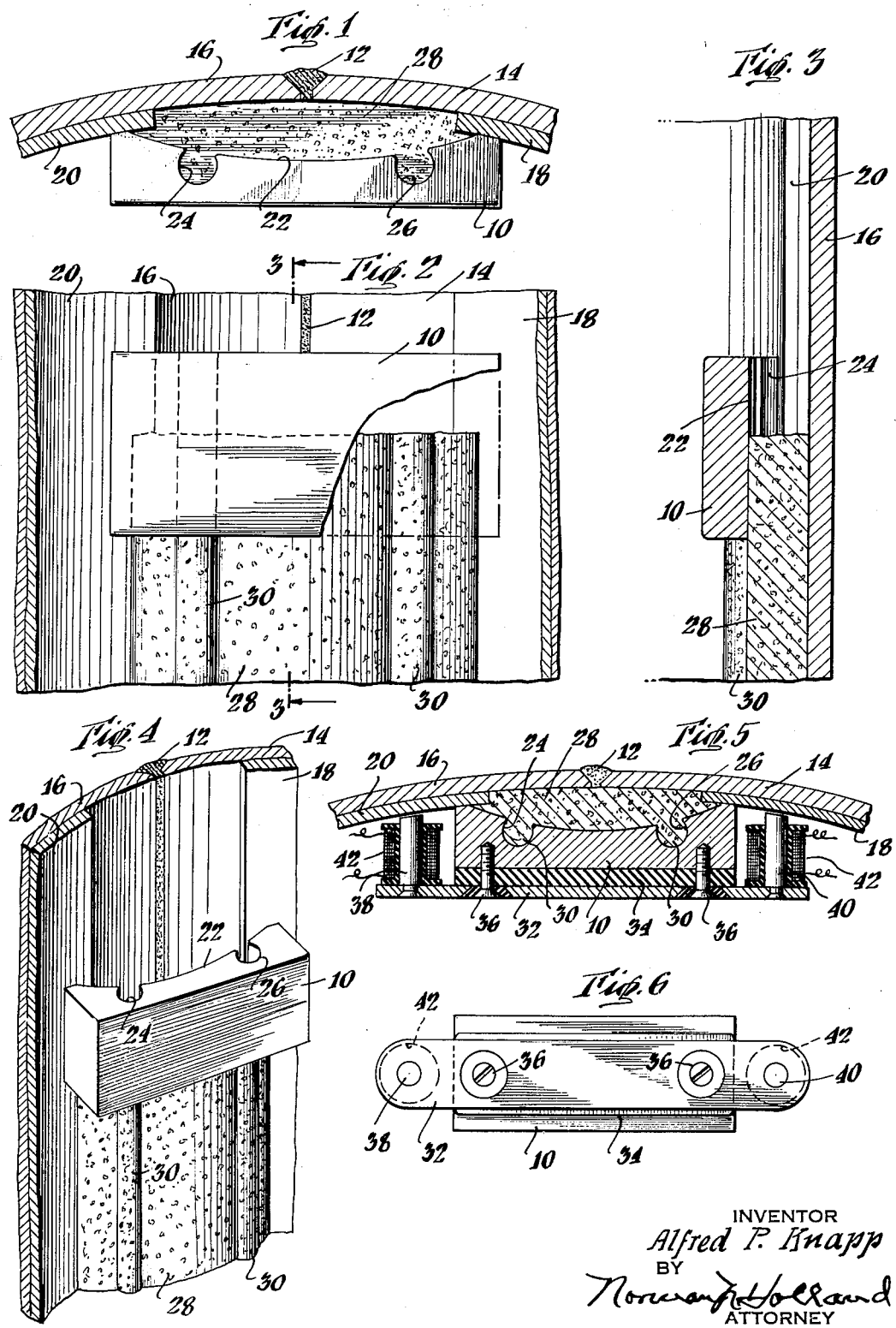
INVENTOR
Alfred P. Knapp
BY
Norman R. Holland
ATTORNEY Patented Mar. 6, 1956

2,736,937

APPARATUS FOR CLADDING TANKS

Alfred P. Knapp, Jackson Heights, N. Y., assignor to Knapp Mills Incorporated, Long Island City, N. Y., a corporation of New York Application June 11, 1954, Serial No. 436,054

11 Claims. (Cl. 22—123)

This invention relates to application of protective coatings to tanks and other similar structures and more specifically concerns an improved method and apparatus for expediting the application of coatings of lead and other similar materials to uncladded areas adjoining welded seams on the inside of cladded tanks.

In the fabrication of large tanks for chemicals and other corrosive materials, an internal lead coating or cladding is provided to protect it against the corrosive action of the chemicals. Since these tanks are formed of a plurality of sections welded one to the other, the lead cladding bonded to such sections prior to assembly of the tank must be terminated several inches from the edges of each plate or section to avoid contamination of the weld and of course unnecessary loss of coating material that would be melted by reason of the high welding temperatures. Upon erection of the tank and completion of the welded joints the uncoated portions adjoining each seam must be coated with lead that is not only firmly bonded to these exposed areas of the tank, but also to the adjoining edges of the lead coating or clad.

Heretofore a number of systems have been employed for this purpose wherein a narrow mold or material retaining means was manually held against the side of the tank bridging the area between the edges of the lead clad adjoining the weld and the operator would then burn lead into the mold, causing it to adhere to the exposed portion of the steel tank and also the adjoining edges of the lead sheathing. As the mold was filled the operator moved it upwardly a short distance to apply another section of coating and so on until he applied a vertical strip of lead over the entire welded joint. With molds of this type, the operator not only held the mold against the tank while the lead was being burned in place, but he had to guide it uniformly up the tank wall so that uniform adherence of the lead to each of the edges of the adjoining lead sheathing was attained. This procedure required careful control on the part of the operator with the result that considerable time was required even in the case of experienced cladders.

Accordingly, it is one object of this invention to provide an improved walking mold for applying a lead coating to welded joints on lead lined tanks wherein the mold is held against the internal wall of the tank by the applied lead coating itself and which at the same time automatically functions to guide the mold as it is moved upwardly along the welded seam being coated. In this way the operator is free to concentrate on the formation of the lead coating with the result that he may work more rapidly and effectively. As the mold becomes filled, the operator momentarily interrupts the lead burning process and merely taps the mold upwardly with a small hammer or mallet to bridge a successive area of the seam to be coated whereupon he proceeds to fill the mold again. As a result the entire operation is greatly simplified and an operator can produce a much superior lead seam or coating and in considerably less time.

Another object of the invention resides in the provision of an improved walking mold wherein means are provided within the mold itself for automatically securing it against a lead clad tank and for guiding it as it is moved along the seam to be coated.

The above and other objects of the invention will become more apparent from the following description and accompanying drawings forming part of this application.

In the drawings:

Fig. 1 is a cross sectional view of a mold in accordance with the invention in operative position against the internal wall of a lead clad tank;

Fig. 2 is a side elevational view of the mold illustrated in Fig. 1;

Fig. 3 is a cross sectional view taken along the lines 3—3 of Fig. 2;

Fig. 4 is a perspective view of a mold in accordance with the invention showing a completed portion of a lead seam;

Fig. 5 is a cross sectional view of a modified embodiment of the invention; and

Fig. 6 is an elevational view of the embodiment shown in Fig. 5.

Briefly, the mold in accordance with the invention, which may be made of steel or other suitable material, is provided with one or more grooves or guiding means formed in the mold itself and which are filled with lead simultaneously with the application of the lead coating being applied over the welded seam and joined with the edges of the lead clad on the inside of the tank. The deposition of lead within these guiding means functions not only to hold the mold against the side of the tank, but also to guide it as it is moved upwardly and thus relieve the operator of the need for holding it in position during the lead burning operation.

Referring to Figs. 1 through 4, the mold 10 in accordance with the invention is shown in position over a welded seam 12 joining two plates 14 and 16 of a tank. These plates prior to their installation as part of the tank were provided with lead coatings 18 and 20 terminated several inches from the edge of their respective plates so that the plates could be easily and securely welded in position. The termination of the lead lining or cladding in this way leaves elongated areas of uncoated steel which, of course, must be filled to protect both the plates and the welded seam. This is accomplished through the utilization of the mold 10 which is of sufficient length to span the space between the lead liners 18 and 20 and receive the lead or other inert metal to be firmly bonded to the adjoining edges of the lead liner and to the exposed portion of the plates 14 and 16. In the preferred embodiment the mold is substantially rectangular in shape and has a concave inner surface 22 bridging the lead liners 18 and 20. As lead is burned into the space defined by the tank and the internal surface 22 of the mold 10, a secure bond will be formed with the adjoining edges of the lead liners and with the exposed tank surface. When the space defined by the mold is substantially filled, the mold is moved upwardly to receive additional lead and this procedure is continued until the entire area or strip is coated.

In order to secure the mold firmly against the inside of the tank and guide it during the molding operation, a pair of grooves 24 and 26 are provided in the wall 22. While these grooves are preferably circular in shape they may be of any desired configuration having suitable undercut portions acting to hold the mold in position. In the present embodiment of the invention the diameter of the grooves 24 and 26 is larger than the opening of these grooves in the wall 22 so that when lead is melted therein they automatically hold the mold in position against the tank. Figs. 2 and 3 show a finished portion of the lead seam 28 on which a pair of rails or guides 30 have been formed by reason of the deposition of lead within the grooves 24 and 26.

The importance of this walking mold becomes more apparent in the case of relatively large tanks wherein ladders and scaffolding must be used in order to enable operator to completely cover a vertical joint or seam in the tank. With prior devices the operator not only had to balance himself on the scaffolding but also had to hold the mold and perform the lead burning operation. With this invention however he is completely relieved from the need for holding the mold against the wall of the tank and may concentrate on the lead burning process with the result that he can produce a far superior clad more safely and at a much faster rate.

In the case of tanks wherein the plates 14 and 16 are formed of a magnetic material, magnetic means may be employed with the mold 10 to aid in securing it in position against the wall of the tank. Figs. 5 and 6 illustrate such an arrangement wherein the mold 10 is provided with a transverse back plate 32 spaced from the mold by a sheet of insulating material 34 and secured thereto by screws 36 or other suitable fastening means. The plate 32 extends beyond the edges of the mold 10 and carries a pair of magnetic cores 38 and 40, each having an electromagnetic coil 42. The windings of these coils 42 may be connected either in series or in parallel and energized by a suitable source of current. The inner ends of the cores 38 and 40 may be sloped to conform more nearly with the internal contour of the tank and are preferably spaced slightly from the cladding 18 and 20 so that the edges of the mold 10 will be drawn tightly against the cladding as shown in Fig. 5. The use of the magnets enables the operator to start the lead seam without having to hold the mold in position and prevent the mold 10 from being guided away from the tank by reason of imperfections or irregularities in the cladded portions 18 and 20. While a pair of electromagnets have been illustrated and arranged to form a closed magnetic circuit which includes the plates 14 and 16 of the tank and the transverse supporting member 32, it is apparent that other types of magnets and magnetic circuits may also be used. While in the modification shown in Figs. 5 and 6 the magnets are shown on a mold having the features of the preferred embodiment, it will be understood that the magnets may in certain cases be used alone with a mold not having the guiding and holding grooves 30 therein, but the results in such cases may be less effective than with the preferred embodiment.

In the lining operation, the inside of the tank adjoining the seam which is to be lead lined is treated so that the lead will bond to the inner side of the tank. The mold may be made of a material which does not bond to lead or the portion which is exposed to the lead is not treated with a material which causes the bond, and hence does not bond with the lead.

While only two embodiments of the invention have been shown and described, it is apparent that changes, modifications and alterations may be made without departing from the true scope and spirit thereof.

Having thus described my invention I claim:

1. A mold for applying a generally upright strip of coating material to a wall comprising a mold adapted to bridge a transverse portion of the area of the wall to be coated and be moved successively along said area as the coating material is deposited therein to form said strip, said mold including recessed portion for receiving coating material which hardens to hold the mold against said wall and guide it over the area to be coated.

2. A mold for applying strips of coating material to a wall comprising a block adapted to span a portion of the area to be coated, and means in said block for receiving a portion of said coating material as it is deposited to form the strip, said material hardening within said means to form guides for holding said mold in position and guiding it along the path to be coated.

3. A mold according to claim 2 wherein said means includes at least one undercut groove.

4. A mold for applying a vertical strip of coating material to a wall comprising a rectangular member having a concave surface for bridging a narrow transverse section of the area of the wall to be coated and moved lengthwise of said area to form said strip as coating material is deposited in the space defined by the adjoining surface of the mold and wall, said mold including at least two undercut grooves in said concave wall to receive coating material and form guides for holding the mold and guiding it over the area to be coated.

5. A mold according to claim 4 wherein said rectangular member includes means for magnetically securing said mold to said wall.

6. A mold according to claim 4 wherein said undercut grooves are of circular section and have a circumference exceeding 180 degrees.

7. Means for coating uncladded welded seams of lead cladded tanks comprising a mold having an elongated surface bridging a portion of the area between adjoining edges of the lead cladding said mold being movable lengthwise of said area as coating material is applied to form a continuous strip and having at least two undercut grooves for receiving a portion of said coating material which hardens to form guides to hold said mold in position and assist in guiding it lengthwise of the area to be coated.

8. Means according to claim 7 wherein said mold includes a pair of electromagnets which cooperate with the tank wall to assist in securing the mold in position thereon.

9. A walking mold comprising a rectangular block of material having concavity on one face thereof and at least two undercut grooves in the surface of said concavity.

10. A walking mold comprising a rectangular block of material having an elongated concave surface in one side thereof and terminating at points spaced from the ends of said block a sheet of insulating material on the surface of said block opposing said concave surface, a strip of magnetic material overlying said insulating material and extending beyond the ends of and secured to said block, and a pair of magnets supported on the ends of said strip with the outer ends of said magnets in approximate alignment with the face of the block to hold said blocks against metal surface to be lead lined.

11. The method of applying a strip of cladding material to a wall comprising the steps of positioning a retaining means having at least one groove therein to span a transverse portion of the area to be cladded, depositing cladding material between said retaining means and the area to form a cladding serving to hold said retaining means in position against said wall and then successively moving the retaining means along the said area to be cladded while depositing additional material between the retaining means and the area to complete said strip.

References Cited in the file of this patent

UNITED STATES PATENTS

| | | |
|---|---|---|
| 1,472,022 | Cockbill et al. | Oct. 23, 1923 |
| 1,531,472 | Baker | Mar. 31, 1925 |